United States Patent
Barquilla

(10) Patent No.: US 7,684,988 B2
(45) Date of Patent: Mar. 23, 2010

(54) TESTING AND TUNING OF AUTOMATIC SPEECH RECOGNITION SYSTEMS USING SYNTHETIC INPUTS GENERATED FROM ITS ACOUSTIC MODELS

(75) Inventor: Ricardo Lopez Barquilla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1292 days.

(21) Appl. No.: 10/965,987

(22) Filed: Oct. 15, 2004

(65) Prior Publication Data

US 2006/0085187 A1    Apr. 20, 2006

(51) Int. Cl.
G10L 15/14    (2006.01)

(52) U.S. Cl. .................... 704/256.1; 704/243; 704/246; 704/258

(58) Field of Classification Search ................. 704/258, 704/266, 270, 243, 251, 256, 256.1–256.8, 704/246

See application file for complete search history.

(56) References Cited

U.S. PATENT DOCUMENTS

| | | | | |
|---|---|---|---|---|
| 5,230,037 A | * | 7/1993 | Giustiniani et al. | 704/200 |
| 5,682,501 A | * | 10/1997 | Sharman | 704/260 |
| 5,913,193 A | * | 6/1999 | Huang et al. | 704/258 |
| 6,119,085 A | | 9/2000 | Lewis et al. | |
| 6,366,883 B1 | * | 4/2002 | Campbell et al. | 704/260 |
| 6,622,121 B1 | | 9/2003 | Hubert et al. | |
| 2002/0198712 A1 | * | 12/2002 | Hinde et al. | 704/251 |
| 2005/0049868 A1 | * | 3/2005 | Busayapongchai | 704/251 |

OTHER PUBLICATIONS

Tokuda et al. "An HMM-based speech synthesis system applied to English", Proc. IEEE workshop on speech synthesis, 2002.*
Toda, "High quality and flexible speech synthesis with segment selection and voice conversioni", PhD thesis, Mar. 224, 2003, Dept. Information processing, Nara Institute of Science and Technology, Japan.*
Yonggang Deng et al., "Estimating Speech Recognition Error Rate without Acoustic Test Data", Eurospeech 2003, Sep. 2003, p. 929-932.

* cited by examiner

*Primary Examiner*—Richemond Dorvil
*Assistant Examiner*—Jialong He
(74) *Attorney, Agent, or Firm*—Joseph R. Kelly; Westman, Champlin & Kelly, P.A.

(57) ABSTRACT

A system and method of testing and tuning a speech recognition system by providing pronunciations to the speech recognizer. First a text document is provided to the system and converted into a sequence of phonemes representative of the words in the text. The phonemes are then converted to model units, such as Hidden Markov Models. From the models a probability is obtained for each model or state, and feature vectors are determined. The feature vector matching the most probable vector for each state is selected for each model. These ideal feature vectors are provided to the speech recognizer, and processed. The end result is compared with the original text, and modifications to the system can be made based on the output text.

11 Claims, 5 Drawing Sheets

TESTING AND TUNING OF AUTOMATIC SPEECH RECOGNITION SYSTEMS USING SYNTHETIC INPUTS GENERATED FROM ITS ACOUSTIC MODELS

BACKGROUND OF THE INVENTION

The present invention relates to speech recognition. In particular, the present invention relates to the testing and tuning of a speech recognizer.

First, a basic description of the processes used in a speech recognition system will be described. In speech recognition systems, an input speech signal is converted into words that represent the verbal content of the speech signal. This conversion begins by converting the analog speech signal into a series of digital values. The digital values are then passed through a feature extraction unit, which computes a sequence of feature vectors based on the digital values. Each feature vector is typically multidimensional and represents a single frame of the speech signal.

To identify a most likely sequence of words, the feature vectors are applied to one or more models that have been trained using a training text. Typically, this involves applying the feature vectors to a frame-based acoustic model in which a single frame state is associated with a single feature vector. Recently, however, segment models have been introduced that associate multiple feature vectors with a single segment state. The segment models are thought to provide a more accurate model of large-scale transitions in human speech.

All models, both frame based and segment based, determine a probability for an acoustic unit. In initial speech recognition systems, the acoustic unit was an entire word. However, such systems required a large amount of modeling data since each word in the language had to be modeled separately. For example, if a language contains 10,000 words, the recognition system needed to 10,000 models.

To reduce the number of models needed, the art began using smaller acoustic units. Examples of such smaller units include phonemes, which represent individual sounds in words, and senones, which represent individual states within phonemes. Other recognition systems used diphones, which represent an acoustic unit spanning from the center of one phoneme to the center of a neighboring phoneme. More recent recognition systems have used triphones which represent an acoustic unit spanning three phonemes (such as from the center of one phoneme through the primary phoneme and to the center of the next phoneme).

When determining the probability of a sequence of feature vectors, speech recognition systems of the prior art did not mix different types of acoustic units. Thus, when determining a probability using a phoneme acoustic model, all of the acoustic units under consideration would be phonemes. The prior art did not use phonemes for some segments of the speech signal and senones for other parts of the speech signal. Because of this, developers had to decide between using larger units that worked well with segment models or using smaller units that were easier to train and required less data.

During speech recognition, the probability of an individual acoustic unit is often determined using a set of Gaussian distributions. At a minimum, a single Gaussian distribution is provided for each feature vector spanned by the acoustic units.

The Gaussian distributions are formed from training data and indicate the probability of a feature vector having a specific value for a specific acoustic unit. The distributions are formed from training data composed illustrating by thousands of repetitions of the different acoustic units found in different places, contexts by different speakers and with different acoustic conditions. A final distribution can be described as an approximation of the histogram of all the vectors for all the occurrences of a particular modeling unit. For example, for every occurrence of the phoneme "th" in the training text, the resulting values of the feature vectors are measured and used to generate the Gaussian distribution.

Because different speakers produce different speech signals, a single Gaussian distribution for an acoustic unit can sometimes produce a high error rate in speech recognition simply because the observed feature vectors were produced by a different speaker than the speaker used to train the system. To overcome this, the prior art introduced a mixture of Gaussian distributions for each acoustic unit. Within each mixture, a separate Gaussian is generated for one group of speakers. For example, there could be one Gaussian for the male speakers and one Gaussian for the female speakers.

Using a mixture of Gaussians, each acoustic unit has multiple targets located at the mean of each Gaussian. Thus, by way of example, for a particular acoustic unit, one target may be from a male training voice and another target may be from a female training voice.

However, even as the development of speech recognizers advanced there have remained many problems with the accuracy of the recognizers when presented with certain types of words. As the accuracy of the vectors has increased, errors still occur, due to the packaging and interpretation of the packaged vectors. These problems can include errors due to mismatches between the acoustic model and the utterances spoken, between the language model and the expected text, a combination of both, or other problems such as errors in the pronunciations or in the speech recognizer engine. Among the problems related with the language model a particularly difficult problem is the one with the homonyms.

Homonyms are words that sound alike, but have a different spelling and meaning. For example common homonyms include read/reed, read/red, their/there, here/hear, cue/queue, whether/weather, and fore/for/four. As these words are pronounced exactly the same the recognizer must chose one of the words to match the spoken utterance. In most cases the recognizer selects the word that is indicated as a preferred word. This preference can be done for example, according to which word is the most commonly used version of the word, or which word linguistically appears to be appropriate using language model information.

Language model related errors arise in instances where the speech recognition system cannot recognize individual words in any context regardless of the data input. In this situation the expected word appears in the list of alternates but it is not the first choice. These words can be recognized as long as you reduce the weight of the language model. Language model induced errors are instances where the speech recognition system can recognize individual words when the words are presented in isolation but not in the context in which these words are presented in the test. For example, if the language model can recognize "to hose" in isolation, but not "want to hose" (for example, the system may recognize the input as "want to host") this is a language model error. In a second example of such an error is where the language model will properly recognize "July $25^{th}$", but not "July $25^{th}$.".

Other errors can be attributed to acoustic model mismatch, the speaker, and other sources. Most often these errors are due to a mismatch between the speaker production of the utterances and the models due to a different pronunciation, accent, noise environment, etc., and are not caused by any internal error in the system. However, because of the nature of the speech recognition systems, these types of errors can appear similar to the above errors. Therefore, it is necessary for the developer to identify the other error types without having to consider the possibility that the errors stemmed from an acoustic mismatch, for instance, the present invention addresses at least some of these problems.

SUMMARY OF THE INVENTION

One embodiment of the present invention is directed towards a system and method for testing and tuning a speech recognizer based upon text documents. The present invention leverages the large existing corpus of text documents instead of using expensive sound files to test the speech recognizer. The benefits of leveraging the text documents can include the ability to functionally test the features of the systems based in speech recognizer systems formatting of the results, alternative results when the initial one is wrong, etc., testing of a system without needing any speakers of the language, and predicting a portion of the errors the system will have in real situations.

In one embodiment, a text document is received by the system at a pronunciation tool. The pronunciation tool determines the pronunciation of each word in the text document. To achieve this the tool can look to either a database of words and associated pronunciations, or a text-to-speech synthesizer. These pronunciations are then converted to a sequence of phonemes. The sequence of phonemes can either be determined from the pronunciation of the word or can be stored in the database entry for the word.

Next, the sequence of phonemes is converted into models by a model unit generator. The model unit generator can obtain models from a database of models. For each phoneme at least one model is identified that represents the phoneme. These models are based on a the "phone" model. In other words, the model unit generator uses diphones, triphones, quadphones, etc. Thus, depending on how the sequence of phonemes is structured, the model unit generator may optionally need to convert the sequence of phonemes into phones. In one embodiment the model unit generator obtains Hidden Markov Models (HMMs) for each phoneme, and uses triphones to represent the phoneme. Using triphones results in Hidden Markov Models with three Markov States. The model unit generator also obtains the probability distribution for each of the Markov states. The HMM and probabilities are passed to an ideal vector generator. In one embodiment each triphone is represented by three senones. The senone is a state of a Hidden Markov model. Each senone is a description of probability distribution function described as a linear combination of multidimensional Gaussians.

The ideal vector generator packages together a sequence of vectors for each phoneme in the sequence of phonemes. The ideal vector generator accesses a database of feature vectors and determines the feature vector that matches, or most closely matches, the point in the distribution curve that has the highest probability. As these feature vectors are illustratively based on the most probable state, they are called ideal vectors. The ideal vector generator can illustratively use the acoustic model of the speech recognizer for the database of feature vectors. By using the acoustic model for the feature vectors, the present invention provides to the speech recognizer the feature vectors it expects for each phoneme that represents the word. This avoids acoustic mismatches.

The packaged ideal vectors are then provided to the speech recognizer. They are provided to the speech recognizer after the feature extraction module, but prior to any further processing on the feature vectors. This in essence appears to the speech recognizer as if the vectors were determined internally. The ideal vectors are subsequently processed according to the normal rules of the speech recognizer and then output as text. The developer can then test and tune the speech recognizer based upon the recognition results. By providing a perfect input from the acoustic point of view of the view of the speech recognizer, a developer will know that every error in the testing comes from a mismatch or weakness in the language model, or from an internal error in the system. These errors are distinguished from expected errors due to acoustic mismatch that are encountered when using real audio files for the testing.

DETAILED DESCRIPTION OF ILLUSTRATIVE EMBODIMENTS

The present invention deals with testing or tuning a speech recognizer based on separately generated feature vectors. Prior to describing the present invention in greater detail, one exemplary environment in which the invention can be used will be discussed.

Figure 1:
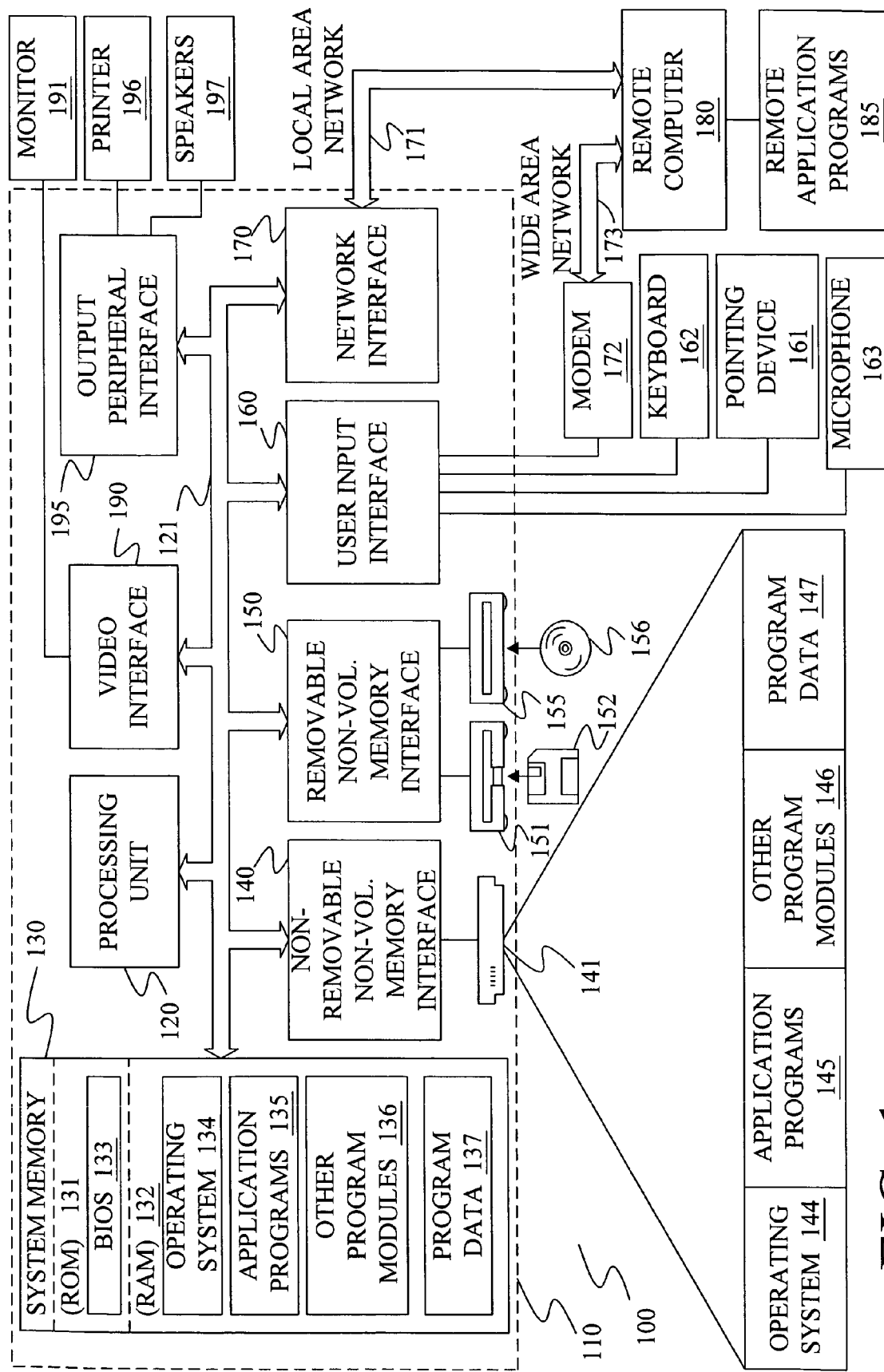
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
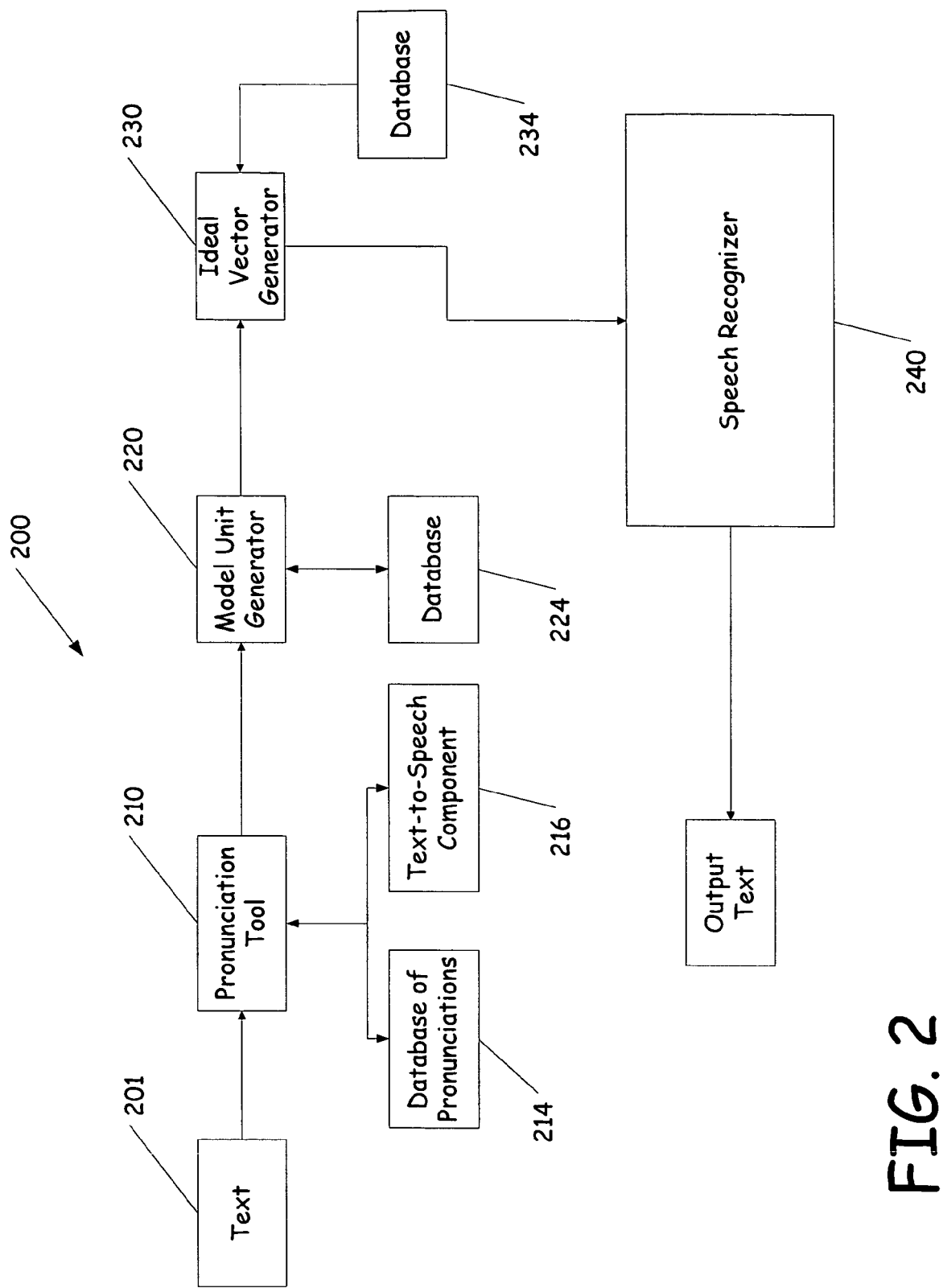
FIG. 2 is a block diagram illustrating the components of the speech recognition testing system according to one embodiment of the present invention.

FIG. 2 is a block diagram illustrating the components of the speech recognition testing and tuning system 200 according to one embodiment of the present invention. The testing component 200 includes a pronunciation tool 210, a model unit generator 220, and an ideal vector generator 230, and interfaces with a speech recognizer 240. The details of each of these components is provided below.

Text 201 is provided to the testing component 200. This text 201 can take many forms, depending on the parts of the system that the developer is testing or tuning. In one embodiment the developer enters the text 201 by hand. However, in another embodiment a plurality of text entries are fed to the component 200. In this illustrative embodiment the text is passed to the component as a file including a plurality of words that the developer has determined will likely cause problems for an ordinary speech recognition system. The text may be in any language, but preferably the text is in the language that the speech recognizer operates on.

The pronunciation tool 210 is a component of the testing system 200 that is configured to identify a pronunciation, or multiple pronunciations for a given text 201. As the text 201 is received at the pronunciation tool 210, a pronunciation for each word in the text is illustratively obtained from either a database of pronunciations 214 or from a text-to-speech synthesizer 216. However, prior to obtaining a pronunciation, the pronunciation tool 210 identifies the words in the text and also converts any punctuation to a word format. The result returned by either the database of pronunciations 214 or the text-to-speech synthesizer 216 is a sequence of phonemes that represent a pronunciation of the word or words in the text. These phonemes are then output to the model unit generator 220.

Database 214 is in one embodiment the same database that is used by the speech recognition component 240 to identify the words associated with a given speech input from the user. However, other databases can be used. Database 214 illustratively includes an entry for each word the speech recognition system is able to recognize. For each word that the system can recognize, the database 214 also contains at least one sequence of phonemes that represents a pronunciation of the word. This sequence of phonemes is returned to the pronunciation tool 210.

Figure 3:
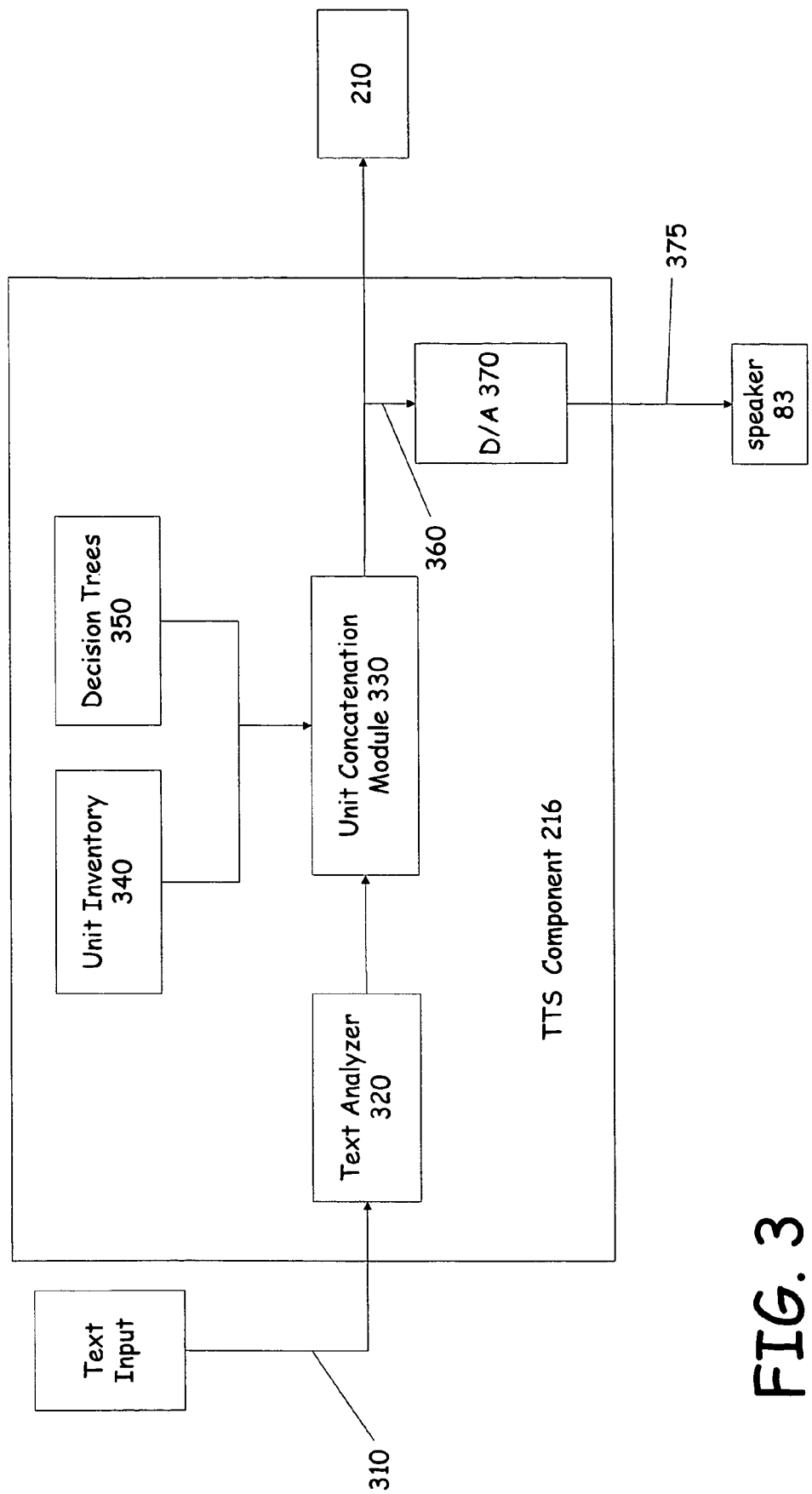
FIG. 3 is a block diagram illustrating the components of a text-to-speech engine that can be used with the present invention.

An exemplary text-to-speech synthesizer 216 is illustrated in FIG. 3. However, other text-to-speech synthesizers or letter to sound components can be used. Generally, the generator 216 includes a text analyzer 320 and a unit concatenation module 330. Text to be converted into synthetic speech is provided as an input 310 to the text analyzer 320. The text analyzer 320 performs text normalization, which can include expanding abbreviations to their formal forms as well as expanding numbers, monetary amounts, punctuation and other non-alphabetic characters into their full word equivalents. The text analyzer 320 then converts the normalized text input to a string of sub-word elements, such as phonemes, by known techniques. The string of phonemes is then provided to the unit concatenation module 330. If desired, the text analyzer 320 can assign accentual parameters to the string of phonemes using prosodic templates (not illustrated).

The unit concatenation module 330 receives the phoneme string and constructs corresponding synthetic speech, which is provided as an output signal 360 to a digital-to-analog converter 370, which in turn, provides an analog signal 375 to the speaker 83. However, in the present application the output signal of the synthetic speech is provided to the pronunciation tool 210.

Based on the string input from the text analyzer 320, the unit concatenation module 330 selects representative instances from a unit inventory 340 after working through corresponding decision trees stored at 350. The unit inventory 340 is a store of representative context-dependent phoneme-based units of actual acoustic data. In one embodiment, triphones (a phoneme with its one immediately preceding and succeeding phonemes as the context) are used for the context-dependent phoneme-based units. Other forms of phoneme-based units include quinphones and diphones or other n-phones. The decision trees 350 are accessed to determine which phoneme-based unit is to be used by the unit concatenation module 330. In one embodiment, the phoneme-based unit is one phoneme so a total of 45 phoneme decision trees are created and stored at 350.

The phoneme decision tree 350 is illustratively a binary tree that is grown by splitting a root node and each of a succession of nodes with a linguistic question associated with each node, each question asking about the category of the left (preceding) or right (following) phoneme. The linguistic questions about a phoneme's left or right context are usually generated by an expert in linguistics in a design to capture linguistic classes of contextual affects. In one embodiment, Hidden Markov Models (HMMs) are created for each unique context-dependent phoneme-based unit. One illustrative example of creating the unit inventory 340 and the decision trees 350 is provided in U.S. Pat. No. 6,163,769 entitled "TEXT-TO-SPEECH USING CLUSTERED CONTEXT-DEPENDENT PHONEME-BASED UNITS", which is hereby incorporated by reference, and is assigned to the same assignee as the present application. However, other methods can be used.

As stated above, the unit concatenation module 330 selects the representative instance from the unit inventory 340 after working through the decision trees 350. During run time, the unit concatenation module 330 can either concatenate the best preselected phoneme-based unit or dynamically select the best phoneme-based unit available from a plurality of instances that minimizes a joint distortion function. In one embodiment, the joint distortion function is a combination of HMM score, phoneme-based unit concatenation distortion and prosody mismatch distortion. The text-to-speech synthesizer 216 can be embodied in the computer 110 wherein the text analyzer 320 and the unit concatenation module 330 are hardware or software modules, and where the unit inventory 340 and the decision trees 350 can be stored using any of the storage devices described with respect to computer 110. As appreciated by those skilled in the art, other forms of text-to-speech synthesizers can be used. Besides the concatenative synthesizer 216 described above, articulator synthesizers and format synthesizers can also be used to provide audio proofreading feedback.

Model unit generator 220 is configured to generate models for each of the phonemes in the sequence of phonemes. In one embodiment the model unit generator 220 builds a triphone for each of the phonemes. From the triphone, the model unit generator accesses database 224 to obtain Hidden Markov Models representative of the generated triphone. In one embodiment database 224 is the acoustic model of the speech recognition system. However, other databases containing HMMs or other models for the phonemes can be used. (For example, if the phonemes were generated using text-to-speech synthesizer 216, the calculated HMMs could be used.) As each triphone generated may have multiple HMM associated with it, all associated HMMs states for the triphone are retrieved. These HMM states are passed to the ideal vector generator 230.

Ideal vector generator 230 receives all of the HMM generated by the model unit generator. For each HMM the ideal vector generator 230 identifies the three Markov states or senones. However, in other embodiments there may be more or less Markov states for the phoneme. Then the ideal vector generator 230 determines the relative probability of each of the Markov states for each HMM. Then the ideal vector generator 230 selects for each state the vector of points that produce the maximum likelihood. However, if other models are used then the ideal vector generator 230 determines the relative probability of that model.

In the case of Hidden Markov Models the ideal vector generator 230 selects for each dimension the point in the output probability distribution of each Markov state that has the maximum likelihood. However, for example, in the case where the probability is represented based upon multivariate mixture Gaussian distributions, the ideal vector generator 230 selects the mixture with the highest combination of weight and Gconst. Once the best mixture has identified, the ideal vector generator 230 finds the feature vector or code word in the acoustic model of the speech recognizer or other database 234, that most closely matches the determined mixture for the Markov state. Once the feature vector has been identified they are packaged together and transmitted to the speech recognition component 240.

Figure 4:
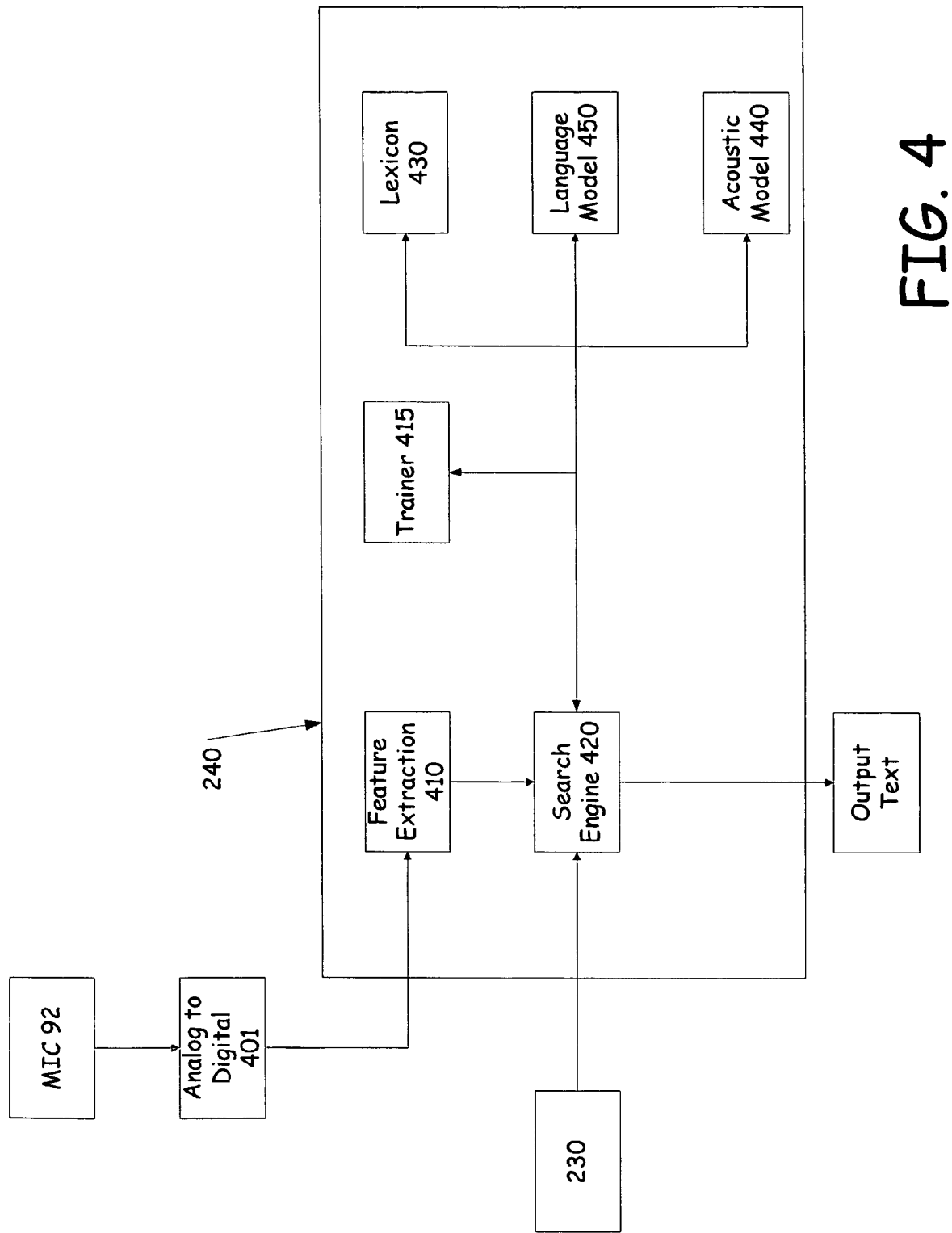
FIG. 4 is a block diagram illustrating one illustrative speech recognition system in which the present invention can be used.

An exemplary embodiment of the speech recognition system 240 is illustrated in FIG. 4. The speech recognition system 240 includes the microphone 92, an analog-to-digital (A/D) converter 401, a training module 415, feature extraction module 410, a lexicon storage module 430, an acoustic model along with senone trees 440, a tree search engine 420, and a language model 450. It should be noted that the entire system 240, or part of speech recognition system 240, can be implemented in the environment illustrated in FIG. 1. For example, microphone 92 can preferably be provided as an input device to the computer 110, through an appropriate interface, and through the A/D converter 401. The training module 415 and feature extraction module 410 can be either hardware modules in the computer 110, or software modules stored in any of the information storage devices disclosed in FIG. 1 and accessible by the processing unit 120 or another suitable processor. In addition, the lexicon storage module 430, the acoustic model 440, and the language model 450 are also preferably stored in any of the memory devices shown in FIG. 1. Furthermore, the tree search engine 420 is implemented in processing unit 120 (which can include one or more processors) or can be performed by a dedicated speech recognition processor employed by the personal computer 110.

In the embodiment illustrated, during speech recognition, speech is provided as an input into the system 240 in the form of an audible voice signal by the user to the microphone 92. The microphone 92 converts the audible speech signal into an analog electronic signal which is provided to the A/D converter 401. The A/D converter 401 converts the analog speech signal into a sequence of digital signals, which is provided to the feature extraction module 410. In one embodiment, the feature extraction module 410 is a conventional array processor that performs spectral analysis on the digital signals and computes a magnitude value for each frequency band of a frequency spectrum. The signals are, in one illustrative embodiment, provided to the feature extraction module 410 by the A/D converter 401 at a sample rate of approximately 16 kHz.

The feature extraction module 410 divides the digital signal received from the A/D converter 401 into frames that include a plurality of digital samples. Each frame is approximately 10 milliseconds in duration. The frames are then encoded by the feature extraction module 410 into a feature vector reflecting the spectral characteristics for a plurality of frequency bands. In the case of discrete and semi-continuous Hidden Markov Modeling, the feature extraction module 410 also encodes the feature vectors into one or more code words using vector quantization techniques and a codebook derived from training data. Thus, the feature extraction module 410 provides, at its output the feature vectors (or code words) for each spoken utterance. The feature extraction module 410 provides the feature vectors (or code words) at a rate of one feature vector or (code word) approximately every 10 milliseconds.

Output probability distributions are then computed against Hidden Markov Models using the feature vector (or code words) of the particular frame being analyzed. These probability distributions are later used in executing a Viterbi or similar type of processing technique.

As the present invention is designed to test and tune the speech recognizer 240, digital signals representative of the feature vectors are provided directly to the speech recognizer 240 from the ideal vector generator 230. As these vectors are generated elsewhere the need for the above processing of speech signals is not necessary. However, as a second check of the accuracy of the speech recognizer pronunciations can be provided to the speech recognizer. Regardless, the feature vectors are provided to the tree search engine 420.

Upon receiving the code words from the feature extraction module 410 or the vector generator 230 (depending on how the system is being tested), the tree search engine 420 accesses information stored in the acoustic model 440. The model 440 stores acoustic models, such as Hidden Markov Models, which represent speech units to be detected by the speech recognition system 240. In one embodiment, the acoustic model 440 includes a senone tree associated with each Markov state in a Hidden Markov Model. The Hidden Markov Models represent, in one illustrative embodiment, phonemes. Based upon the senones in the acoustic model 440, the tree search engine 420 determines the most likely phonemes represented by the feature vectors (or code words) received from the feature extraction module 410, and hence representative of the utterance received from the user of the system.

The tree search engine 420 also accesses the lexicon stored in module 430. The information received by the tree search engine 420 based on its accessing of the acoustic model 440 is used in searching the lexicon storage module 430 to determine a word that most likely represents the codewords or feature vector received from the features extraction module 410. Also, the search engine 420 accesses the language model 450, which is illustratively a 60,000 word trigram language model derived from the North American Business News Corpus and set out in greater detail in a publication entitled CSR-III Text Language Model, University of Penn., 1994, or any other corpus. The language model 450 is also used in identifying the most likely word represented by the input speech. The most likely word is provided as output text.

Although described herein where the speech recognition system 240 uses HMM modeling and senone trees, it should be understood that the speech recognition system 240 can take many forms and all that is required is that it provide as an output the text spoken by the user or provided by the testing system 200.

Figure 5:
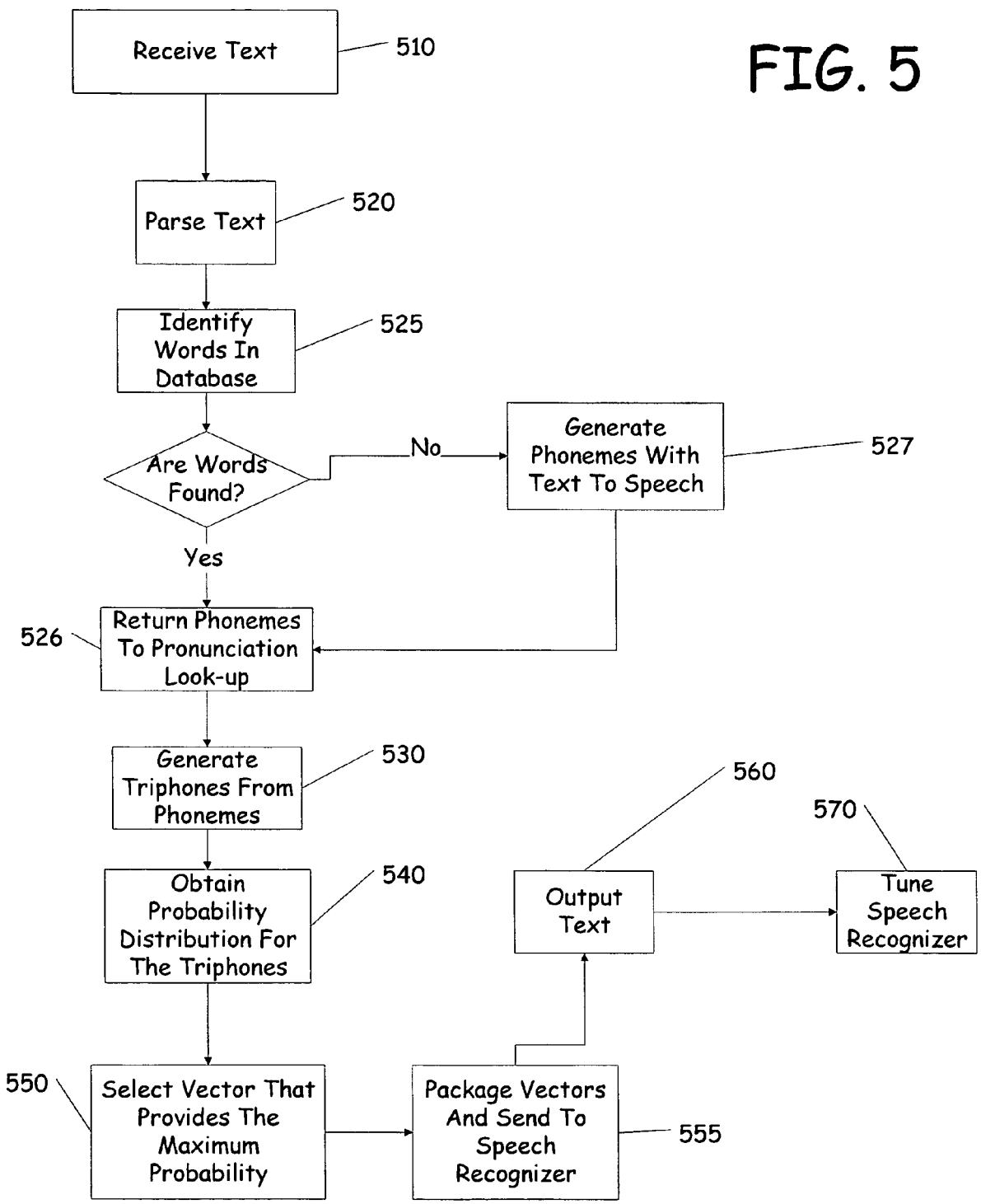
FIG. 5 is a flow diagram illustrating the steps executed by the testing system according to one embodiment of the present invention.

FIG. 5 is a flow diagram illustrating the steps executed by the testing system 200 according to one embodiment of the present invention. First the developer provides a text 201 to the testing system 200 at step 510. This text can be a word or a series of words that the developer anticipates will cause an error in recognition by the speech recognizer. For example a text that can be input can be "Hi Becky. I am sending you this e-mail to give you the latest update from Seattle. After four months of house searching I bought a house last week. The house is grey and has four bedrooms, three bathrooms, and a great big deck with a view of the lake." This text is complete with error inducing verbiage, and can be erroneously recognized by a typical speech recognizer as something like: "Hideki I'm sending you this e-mail to give you the latest update from Seattle. After four months of house searching a bought a house last week. The house is gray and has four bedrooms, three bathrooms, and a great big back with a view of the lake."

This text is first received by the pronunciation tool 210. The pronunciation tool 210 first parses the text to identify each word in the text, and converts any punctuation present into a representation of the punctuation. For example, a "," is converted to the word "comma". This parsing and conversion of the text is illustrated at step 520.

Once the text has been parsed and converted the pronunciation tool 210 then searches the database of pronunciations 214 to identify a pronunciation and a sequence of phonemes associated with each word in the text. If there are multiple pronunciations for the identified word the pronunciation tool 210 selects the first one. However, other methods of selecting the pronunciation can be used. This is illustrated at step 525. If a match is found, the associated sequence of phonemes for the word are returned to the pronunciation tool 210. However, if a match is not found the word is passed to the text-to-speech synthesizer 216. The text-to-speech synthesizer 216 generates a sequence of phonemes for the word, and passes this sequence back to the pronunciation tool 210. This is illustrated at step 526 The process of generating the pronunciation and the sequence of phonemes for the word is described in greater detail with respect to FIG. 3 above. The generation of phonemes by the text-to-speech synthesizer 216 is illustrated at step 527. The phonemes are returned to the pronunciation tool 210 at step 526.

The pronunciation tool 210 then passes the sequence of phonemes to the model unit generator 220. The model unit generator 220 takes each of the phonemes in the sequence of phonemes and generates a triphone representation of each of the phonemes. This is illustrated at step 530. Then the model unit generator 220 accesses the database 224 or the acoustic model 440 to obtain a Hidden Markov Model for each of the triphones. This is illustrated at step 540. Once the Hidden Markov Models are obtained the models are passed to the ideal vector generator 230.

The ideal vector generator 230 generates an ideal vector for each of the senones that are used to model the triphones represented by the Hidden Markov Models. To generate the ideal vector, the probability distribution for each of the Markov states of the triphones are obtained. This probability distribution associated with each Markov state can be retrieved at step 540 from the acoustic model 440. However, in other embodiments they can be calculated using any method for determining a probability distribution for the Markov Model and to associated triphone.

In one embodiment each Hidden Markov Model contains three Markov states (senones). Once the probability of each of the Markov states is determined or obtained, the position of the maximum probability in the distribution of probability is selected as the dimension. The feature vector is selected from the acoustic model of the speech recognizer 240 generated during the training, by identifying the feature vector (or code word) that most closely matches the point of maximum probability. This process of generating the feature vectors for each Markov state is illustrated at step 550. The process generates ideal vectors because the vectors that are generated are illustratively based on the maximum point on the distribution for each of the Markov states that comprise the triphone.

Once all of the ideal vectors are generated for the text, they are packaged together and passed to the speech recognizer 240. However, instead of being input as sound patterns to the speech recognizer 240 as in normal speech recognition, they are provided directly to the tree search engine 420. By providing the vectors to the tree search engine 420, the present invention is able to "fool" the speech recognizer into believing that the vectors were received from its own feature extraction module, and were not generated elsewhere. The providing of the ideal vectors to the speech recognizer is illustrated at step 555.

Using the provided feature vectors, the speech recognizer outputs the results of the recognition at step 560. This output can then be analyzed by the developer to identify errors or problems in the speech recognizer's programming. Additional tuning or testing of the system can be done at step 570.

Although the present invention has been described with reference to particular embodiments, workers skilled in the art will recognize that changes may be made in form and detail without departing from the spirit and scope of the invention.

What is claimed is:

1. A speech recognition testing system comprising:
a speech recognizer that provides an output based upon a sequence of feature vectors;
a pronunciation tool that provides a pronunciation of a provided text having at least one word, the pronunciation including a plurality of phonemes, the pronunciation tool comprising a pronunciation store that stores pronunciations for words and a text-to-speech synthesizer that generates phonemes from text, the pronunciation tool first accessing the pronunciation store to obtain the pronunciation for words identified in the text and if the pronunciation store does not include the pronunciation, then using the text-to-speech synthesizer to obtain the pronunciation for the text;
a model unit generator that generates a model for each of the plurality of phonemes from the provided pronunciation and selects a sequence of Hidden Markov Model states for a Hidden Markov Model (HMM) representative of each of the generated models, the selected sequence of HMM states being a sequence that the speech recognizer is to choose as a best sequence during recognition of speech that is recognized to generate the text, wherein generating a model includes selecting a plurality of candidate HMMs for at least one of the generated models;
a feature vector data store storing feature vectors;
a vector generator that generates the sequence of feature vectors to be provided to the speech recognizer from the provided pronunciation of the provided text, wherein at least one of the feature vectors is generated by selecting, for each state in the sequence of HMM states, from the feature vector data store, a feature vector that has a closest probability distribution match with a given mixture in a Markov state in one of the generated models, such that the selected feature vectors produce a best score for the text when the selected feature vectors are provided to the speech recognizer during recognition of the text;
formatting the selected feature vectors in a format used by the speech recognizer; and testing the speech recognizer using the formatted, selected feature vectors.

2. The speech recognition system of claim 1 wherein the pronunciation tool that generates a sequence of phonemes for the pronunciation; and
wherein the model unit generator identifies models for each phoneme in the sequence of phonemes.

3. The speech recognition system of claim 2 wherein the model unit generator accesses a database of models in generating models for each of the phonemes in the sequence of phonemes.

4. The speech recognition system of claim 3 wherein the database of feature vectors comprises an acoustic model of the speech recognizer.

5. A method of testing a speech recognition system, comprising:
receiving a text containing at least one word;
generating a pronunciation for the text with a pronunciation tool, including a plurality of phonemes, by first accessing a pronunciation data store to obtain phonemes indicating pronunciation of the at least one word, and if the pronunciation data store does not contain phonemes for the at least one word, then providing the received text to a text-to-speech synthesizer to obtain the phonemes indicating the pronunciation of the at least one word;
generating a model for each of the phonemes of the pronunciation and selecting a Hidden Markov Model sequence of states for a Hidden Markov Model (HMM) representative of each of the generated models, the selected sequence of HMM states being a sequence that the speech recognizer is to choose as a best sequence during recognition of speech that includes the at least one word, wherein generating a model includes selecting a plurality of candidate HMMs for at least one of the generated models;
generating a sequence of feature vectors for the pronunciation from the model, wherein at least one of the feature vectors is generated by selecting, for each state in the sequence of HMM states, from a feature vector data store, a feature vector that has a closest probability distribution match with a given mixture in a Markov state in one of the generated models, such that the selected feature vectors produce a best score for the text when the selected feature vectors are provided to the speech recognizer during recognition of the at least one word;
providing the sequence of vectors to the speech recognition system; and
outputting text from the speech recognition system, in response to the provided sequence of vectors, for testing evaluation.

6. The method of claim 5 wherein generating the model further comprises:
generating a sequence of model units for the sequence of phonemes.

7. The method of claim 6 wherein generating a sequence of model units for the sequence of phonemes further comprises:
accessing a database of models;
identifying a model in the database of models matching one phoneme in the sequence of phonemes; and
returning that model as the model.

8. The method of claim 6 further comprising:
obtaining at least one probability for each model unit in the sequence of model units.

9. The method of claim 8 wherein the model obtained is a Hidden Markov Model; and
wherein a probability is obtained for each Markov state in the Hidden Markov Model.

10. The method of claim 9 wherein the probability for each Markov state is obtained from a probability distribution for the state.

11. The method of claim 10 wherein the database of feature vectors is an acoustic model of the speech recognition system.

* * * * *